Figure 1:
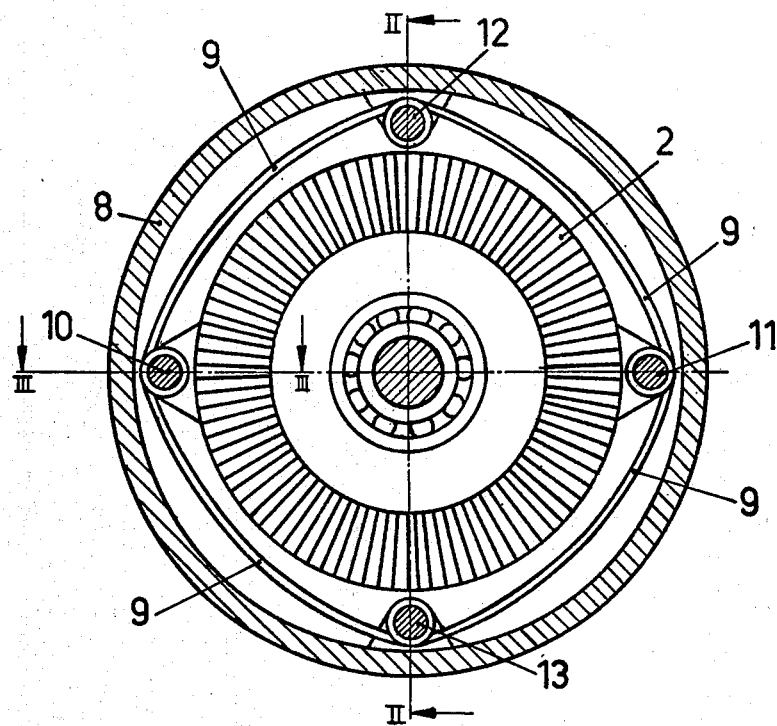

United States Patent [19]

Nilsson

[11] 4,366,726

[45] Jan. 4, 1983

[54] GEAR

[75] Inventor: Sven W. Nilsson, Partille, Sweden

[73] Assignee: SKF Nova AB, Gothenburg, Sweden

[21] Appl. No.: 183,306

[22] Filed: Sep. 2, 1980

[30] Foreign Application Priority Data

Oct. 5, 1979 [SE] Sweden .............................. 7908262

[51] Int. Cl.³ ............................................ F16H 1/28
[52] U.S. Cl. ..................................................... 74/800
[58] Field of Search ........................... 74/18.1, 60, 800

[56] References Cited

U.S. PATENT DOCUMENTS

| | | | |
|---|---|---|---|
| 2,545,562 | 3/1951 | Thiel, Jr. ........................... | 74/800 X |
| 3,049,931 | 8/1962 | Lang, Jr. et al. ................. | 74/18.1 X |
| 3,532,005 | 10/1970 | Bremner, Jr. et al. ........... | 74/800 X |
| 3,933,052 | 1/1976 | Coles .................................... | 74/18.1 |

Primary Examiner—Allan D. Herrmann
Attorney, Agent, or Firm—Eugene E. Renz, Jr.

[57] ABSTRACT

A gear comprises two co-operating gear wheels (1,2), one (2) of which, in operation, performing a conical pendulating movement (nutation). One gear wheel (2) is non-rotationally connected to an adjacent element (8) by resilient elongated members (9), preferably extending mainly in the circumferential direction of the gear wheel between two supports (10,11) arranged diametrically on the gear wheel and two supports (12,13) arranged diametrically on the adjacent element and offset about 90° in relation to the first mentioned supports. The resilient members keep the gear wheel (2) non-rotationally in the adjacent element and permits said pendulating movement of the gear wheel.

3 Claims, 3 Drawing Figures

GEAR

The invention relates to a gear of the kind described in the preamble of the appended claim 1.

Such gears have been known for a long time, e.g. by the contents of the German patent publication No. 4810.

One problem with such gears is to provide a technically and economically satisfactory mounting of the gear wheel whose axis in operation makes a conical pendulating movement. Several mounting methods are known. According to e.g. the device shown in the above mentioned German patent publication, the gear wheel is mounted in a cardan suspension which takes up torque and allows the pendulating movement. This and other known solutions of the mounting problem always comprises the need for a number of bearings for parts which are movable in relation to each other. A cardan joint, for example, comprises four bearing positions. The bearings are subjected to wear and constitute a manufacturing complication.

The object of the present invention is to provide a gear with a simplified design and in which the need for bearings are eliminated to the greatest possible extent.

According to the invention this object is obtained by giving the gear the characterizing features which are stated in the appended claim 1.

A gear according to the invention comprises a minimum number of movable parts which cause friction and wear, and the mounting components are easy and inexpensive to manufacture and operate with a good precision and safety.

Figure 3:
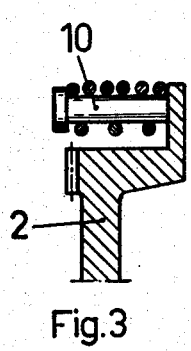
Figure 2:
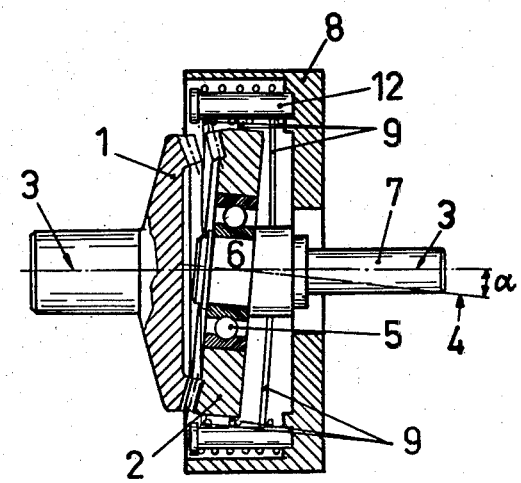

In the following, the invention is described in detail with reference to the drawing, in which FIG. 1 shows a cross section of a portion of a gear according to one embodiment of the inventions with a view of one of the gear wheels, FIG. 2 shows a longitudinal section along the line II—II in FIG. 1 of the gear, and FIG. 3 shows a longitudinal section along the line III—III in FIG. 1 of a portion of the gear.

As appears from FIG. 2, the gear comprises two cooperating gear wheels 1 and 2. The axis of the gear wheel 1 constitutes an angle α with the axis 4 of the gear wheel 2. The gear wheel 2 is rotatably mounted in a bearing 5 on a shaft 6. The centre line of the shaft 6 coincides with the axis 4 of the gear wheel 2 and the shaft is fitted to a drive shaft 7, the center line of which coinciding with the axis 3 of the gear wheel 1. The gear wheel 2 is non-rotatable in relation to an adjacent element 8 in a way which will be described in detail presently. The element 8 can be a fixed gear housing or a rotatable driving device. Upon rotation of the drive shaft 7 of the contact between the gear wheel 2 and the gear wheel 1 is successively moved around the respective gear circle when the axis of the gear wheel 2 performs a conical pendulating movement. Due to the fact that the gear wheels have different numbers of cogs, one wheel will rotate in relation to the other with a lower rotational speed than the rotational speed of the drive shaft 7. This lower rotational speed can be taken out either on a shaft from the gear wheel 1 if the element 8 is prevented from rotating, or on the element 8 if the gear wheel 1 is prevented from rotating.

The gear wheel 2 is connected to the element 8 by resilient elongated members 9, which are suitably made of spring steel wire. The members 9 are preferably arranged with an axial extension mainly circumferentially round the gear wheel 2, as shown in FIG. 1. Two supports 10,11 for the members 9 are arranged diametrically on the gear wheel, as appears in FIG. 1 and FIG. 3, and two supports 12,13 are arranged diametrically on the adjacent element 8 and offset about 90° in relation to the supports 10,11. The members 9 will not appreciably change their shape when subjected to axial loads, so that they can transmit torque from the gear wheel 2 to the adjacent element 8, and the gear wheel is thereby prevented from rotating in relation to the element 8. The members 9 are resiliently twistable and bendable under the influence of torque and forces directed across their axial extension. Thereby the gear wheel 2 is permitted to perform a conical pendulating movement (nutation), whereby the members 9 are subjected to torsion and bending.

When the members 9 are made of spring steel wire, the supports 10,11,12,13 are suitably protrusions around which the wires are wound. All the members 9 can possibly be made of a single wire which runs one or more turns around the gear wheel 2. They may also have another shape, for example band shape, and they may be made of another material than spring steel, e.g. plastics, rubber or the like.

Also other embodiment than the one described are possible within the scope of the claims. The movement of the gear wheel 2 may be brought about in other ways than by mounting the wheel in a rotatable shaft, whose axis is inclined in relation to the axis of rotation, e.g. by a member pressing against the gear wheel and moving in a circular path mainly opposite to the gear circle. By varying the number of cogs and the difference of the number of cogs between the gear wheels, the gear ratio can be varied:

What is claimed is:

1. A gear comprising two co-operating gear wheels (1,2) the axes (3,4) of which constituting an angle (α) and the axis (3) of one wheel, in operation, performing a conical pendulating movement, the apex of the pendulum cone being situated on the axis of the other wheel, one wheel being rotatable in relation to the other wheel, characterized in that the wheel whose axis performs a conical pendulating movement is connected to an adjacent element (8) by resilient elongated members (9) extending between two supports (10,11) arranged diametrically on the gear wheel and two supports (12,13) arranged diametrically on the adjacent element and offset about 90° in relation to the first mentioned supports, the resilient members being resistant to deformation when subjected to axial loads, thereby keeping the gear wheel non-rotatably in relation to the adjacent element, and being resiliently twistable and bendable under the influence of forces directed across their axial extension, thereby permitting the pendulating movement of the axis of the gear wheel.

2. A gear mechanism according to claim 1, characterized in that the resilient elongated members (9) are made of one or more wires.

3. A gear mechanism according to claim 2, characterized in that the supports (10,11,12,13) are constituted by protrusions around which the wires are wound.

* * * * *